United States Patent [19]

Liu

[11] Patent Number: 4,892,901
[45] Date of Patent: Jan. 9, 1990

[54] POLYETHERIMIDE ESTER ELASTOMER

[75] Inventor: Nan-I Liu, Mt. Vernon, Ind.

[73] Assignee: General Electric Company, Mt. Vernon, Ind.

[21] Appl. No.: 139,912

[22] Filed: Dec. 31, 1987

[51] Int. Cl.$^4$ ............................................. C08L 63/06
[52] U.S. Cl. .................................... 524/303; 524/304; 524/349; 524/350; 525/423
[58] Field of Search ................ 525/423, 473; 524/303, 524/304, 349, 350

[56] References Cited

U.S. PATENT DOCUMENTS

| | | | |
|---|---|---|---|
| 3,416,994 | 12/1968 | Chalmers | 525/423 |
| 4,118,535 | 10/1978 | Banucci | 528/206 |
| 4,544,734 | 10/1985 | McCready | 528/288 |
| 4,639,486 | 1/1987 | Liu | 525/423 |

FOREIGN PATENT DOCUMENTS

| | | | |
|---|---|---|---|
| 0108476 | 5/1984 | European Pat. Off. | 525/423 |
| 0053946 | 3/1983 | Japan | 525/423 |
| 0830823 | 3/1960 | United Kingdom | 525/423 |
| 2055109 | 2/1981 | United Kingdom | 525/423 |

Primary Examiner—John C. Bleutge
Assistant Examiner—David Buttner
Attorney, Agent, or Firm—William M. Mufatti; Daniel De Joseph

[57] ABSTRACT

Disclosed is a polyetherimide ester composition comprising at least one polyetherimide ester resin and a modifier composition which is comprised of a modifying amount of at least one multifunctional epoxy resin. The modifier composition may optionally also include a thio ester and a hindered phenol.

25 Claims, No Drawings

POLYETHERIMIDE ESTER ELASTOMER

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low tensile set, high melting temperatures and/or excellent strength/toughness characteristics as well as superior flexibility, which properties render said polyetherimide esters especially suitable for molding and extrusion applications.

However, these polyetherimide esters, in unmodified form, do not have an exceptional melt strength. In addition, the heat stability of these esters can be improved. It would best be very advantageous if polyetherimide esters could be provided which exhibit improved melt strength and, in addition, improved heat stability.

It has now been discovered that these polyetherimide ester polymers can obtain an improved melt strength and a resultant improved blow moldability when they are admixed with a multifunctional epoxy compound. Optionally, the heat stability of the above mentioned polyetherimide ester elastomer can be improved by admixing the elastomer with a multifunctional epoxy compound, a hindered phenol and a thio ester.

SUMMARY OF THE INVENTION

Polyetherimide ester compositions are provided which exhibit excellent melt strength. These compositions are comprised of at least one polyetherimide ester resin and at least one multifunctional epoxy compound.

DESCRIPTION OF THE INVENTION

In accordance with instant invention there are provided polyetherimide ester compositions that exhibit improved melt strength. These compositions are comprised of (i) at least one thermoplastic polyetherimide ester elastomer, and (ii) a multifunctional epoxy compound.

The polyetherimide ester elastomers of the present invention are well known elastomers and are described in U.S. Pat. Nos. 4,544,734 and 4,566,705 to McCready and in U.S. Pat. No. 4,566,688 to McCready et al., all of which are incorporated herein by reference.

These polyetherimide ester elastomers contain imide groups, polyether groups, and ester groups in the polymer chain. They are comprised of the reaction products of:
(i) at least one diol;
(ii) at least one dicarboxylic acid or its ester forming reactive derivative; and
(iii) a set of reactants selected from
 (a) (1) at least one high molecular weight poly(oxy alkylene)diamine, and (2) at least one tricarboxylic acid or its derivative, or
 (b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 300 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and esterforming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-bezoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-napthalene dicarboxylic acid, phenantherene dicarboxylic acid, anthracene dicarboxylic acid, 4,4'-sulfonyl dibenzoic acid, and halo and C$_1$–C$_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of he poly(oxy alkylene)diamine with the tricarboxylic acid.

The poly(oxy alkylene)diamines (iii)(a)(1) suitable for use in the present invention may be represented by the following general formula

$$HN-G-NH \qquad \qquad I.$$

wherein G is the radical remaining after the removal of the amino groups of a long chain alkylene ether diamine. These polyether diprimary diamines are available commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236, 895 and French Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene)glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

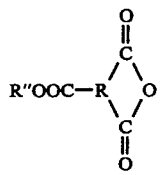  II.

wherein:
R is a trivalent organic radical, preferably a $C_1$–$C_{20}$ aliphatic or cycloaliphatic, or $C_6$–$C_{20}$ aromatic trivalent radical;
R" is preferably hydrogen or a monovalent organic radical which is preferably selected from $C_1$–$C_6$ aliphatic and/or cycloaliphatic radicals and $C_6$–$C_{12}$ aromatic radicals, e.g., benzyl; R" is most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalklyene diimide diacid to dicarboxylic acid the better the strength, crystallization and heat distortion properties of the polymer. Alternatively, the higher the ratio, the better the flexibility, tensile set and low temperature impact characteristics.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is the reacted with the diol and the dicarboxylic acid to form the polyetherimide ester polymers.

The polyoxyalkylene diimide diacid (iii)(b) may be represented by the general formula

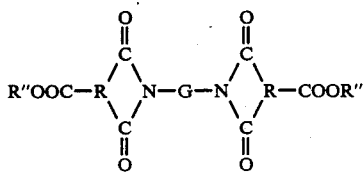  III.

wherein G, R and R" are as defined above.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150'0 C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboxylic acid are such that the weight ratio of the polyoxyalkylene diimide to the dicarboxylic acid is from about 0.002 to 2.01:1, preferably from about 0.01 to 2.01:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butenediol, hexanediol, or cyclohexane dimethanol; and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalklene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofuctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units;

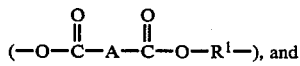, and    IV.

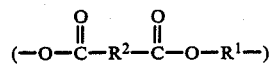    V.

wherein:

A is the residue of the polyoxyalkylene diimide diacid absent the two carboxyl groups, i.e.,

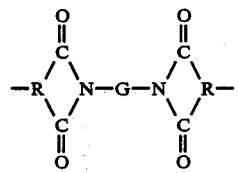

$R^1$ is the residue of the diol absent the two hydroxyl groups, $R^2$ is the residue of the dicarboxylic acid absent the two carboxyl groups, and R and G are as defined above.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalklene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The epoxy resins utilized in the compositions of the present invention include epoxy resins having a functionality (multiple epoxide functional groups) of more than 2.

Preferred epoxy resins include resins derived from an orthocresolformaldehyde novolac which is then reacted with epichlorohydrin to form a polyepoxide. Such resins are manufactured by Ciba-Geiby under the name "ECN" (epoxy cresol novolac) resins. The preferred resin of this resin is ECN 1299 resin, which has the following properties:

Molecular weight-approx.: 1270
Weight per Epoxide: 235
Epoxy Value (Eq./100 gm): 0.425
Melting point (°C.): 99
Functionality (Epoxide type): 4.4

Additional preferred epoxy resins are the D.E.N. 400 series epoxy novolac resins manufactured by Dow Chemical. A particularly preferred novolac epoxy resin in this series is D.E.N. 485 resin, which is a solid epoxy novolac having a functionality of 5.5, and the following structural formula:

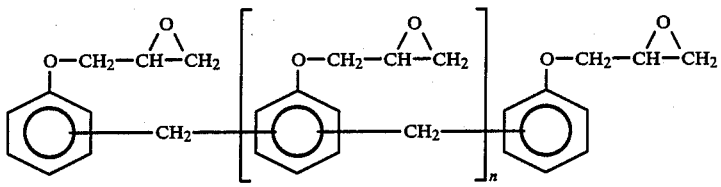

where the average value of n is 3.5. Another preferred multifunctional epoxy novolac resins is the XD series of resins manufactured by the Dow Chemical Company. One particularly preferred multifunctional epoxy resin in this series is XD 9053.01 resin, which has the formula:

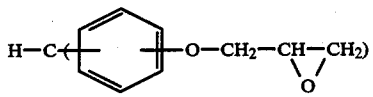

Other multi-epoxy compounds suitable for use herein include poly(O- or N-epoxyalkyl-substituted) cyclic amide, imide or imidate, which usually containing one and only one non-epoxy cyclic moiety although compounds with linked or fused moieties are also contemplated. Preferably, these are compounds in which the epoxyalkyl group is bonded directly to the oxygen or nitrogen atom; however, compounds containing intervening structures, such as 2-carboglycidyloxyethyl compounds, may also be used.

Illustrative cyclic nuclei which may be present in such multifunctional epoxy compounds are the triazine, barbiturate, hydantoin, uracil, pyromellitic diimide, piperazinedione and parabanate ring systems. As previously noted, the epoxy-containing functionalities may be present as substituents on oxygen or nitrogen atoms therein, with nitrogen atoms frequently being preferred. The most suitable multifunctional epoxy compounds of this type are triazine derivatives including triglycidyl cyanurate and triglycidyl isocyanurate (hereinafter "TGIC"). TGIC is particularly preferred by reason of its availability and particular suitability for the formation of branched polyesters. It has the formula

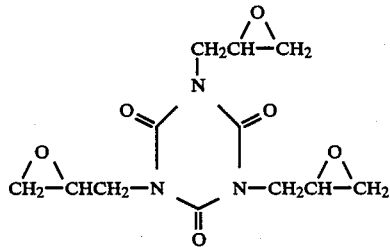

It should be noted that many polyepoxides of this type are irritants and/or health hazards. For example, triglycidyl isocyanurate has mutagenic properties. Contact with the body and inhalation should therefore be avoided as much as possible.

The amount of the multifunctional epoxy compound which is present in the instant composition will generally be dependent upon the particular epoxy compound used as well as upon the particular polyetherimide ester polymer present in the composition. Generally, however, this amount is at least about 0.1 weight percent, based on the total amount of epoxy compound and polyetherimide ester resin present in the compositions, preferably at least about 0.2 weight percent, and more preferably at least 0.25 weight percent, and most preferably at least 0.5 weight percent. An amount of about 2 weight percent of epoxy compound should not be exceeded, preferably in the amount of 1 percent of epoxy compound should not be exceeded. If the compositions contain less than about 0.1 weight percent of epoxy compound there is not a significant improvement in the melt strength of the polyetherimide ester polymer. Amounts of epoxy compound in excess of about 2 weight percent do not appreciably increase or enhance the melt strength of the polyether ester polymers. It is to be understood that the instant compositions may contain only one epoxy compound and/or one polyetherimide ester resin, or they may contain a mixture of 2 or more different epoxy compounds and or polyetherimide ester resins.

It has been further discovered that the heat stability of the compositions of the present invention can be further improved by adding a hindered phenol and a thio ester to the multifunctional epoxy modified polyetherimide ester elastomers.

Thio esters that can be utilized in the present invention are well known in the art, and include Seenox 412S, a trademark of Argus Chemical Corporation for pentaerythritol betalaurylthiopropionate and Mark 2140, a trademark of Witco Corporation for a sulfur containing ester mix. Other suitable thio esters include pentaerythritol alkyl thiopropionate, dimyristyl thiodipropionate, distearyl thiodipropionate, and dilauryl thiodipropionate, all manufactured by Witco Chemical Corporation.

Hindered phenols that can be utilized in the present invention are well known in the art.

Particularly useful hindered phenols are of the formula

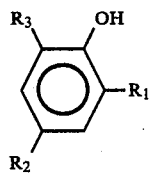

wherein $R_1$ and $R_3$ are hydrocarbon groups having from one to about 20 carbon atoms, and $R_2$ is a hydrogen atom or a hydrocarbon group having from one to about 20 carbon atoms; and bisphenols of the formula

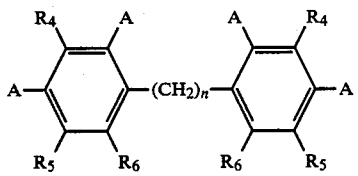

wherein $R_4$, $R_5$ and $R_6$ are each a hydrogen atom or a hydrocarbon group having from one to about 20 carbon atoms, one of the two A's on each ring is a hydroxyl group and the other A on each ring a hydrogen atom or a hydrocarbon group having from one to about 20 carbon atoms; and n is an integer of from 1 to about 20.

Preferred hindered phenols useful in this invention include 2,6-di-tert-butyl-4-methyl-phenol, commonly known as BHT (sold under the tradename Ionol by Shell Chemical Co.); 4,4,-methylene bis(2,6-di-tert-butylphenol) and 2,6-di-tert-butyl-4-n-butylphenol (sold under the tradename Ethyl 702 and Ethyl 744, respectively, by Ethyl Corp.); and tetrakis[methylene 3-(3',5'-di-tert-butyl-4'-hydroxyphenyl) propionate]methane and stearyl-3(3',5'-di-tert-butyl-4'hydroxyphenyl) propionate (sold under the tradenames Irganox 1010 and Irganox 1076, respectively, by Ciba-Geigy).

The preferred ranges of the hindered phenol in the composition of the present invention range from about 0.1 parts by weight to about 1.5 parts by weight of the hindered phenol per 100 parts by weight of the total composition of the polyetherimide ester resin, the multifunctional epoxy compound, the hindered phenol and the thio ester. Preferred ranges of thio ester which can be utilized in the present invention range from about 0.1 parts by weight to about 1.5 parts by weight of thio ester to about 100 parts by weight of the total composition of the polyetherimide ester resin, the multifunctional epoxy compound, the hindered phenol and the thio ester.

The instant compositions may also optionally contain an add-on amount of such commonly known and used additives as oxidative stabilizers; thermal stabilizers, ultraviolet radiation stabilizers; and fillers.

In addition to the above-specified heat stabilizers, many of the oxidative and/or thermal stabilizers known in the art for polyesters may also be used in the practice of the present invention. These may be incorporated either during polymerization or while in a hot melt stage following polymerization. Satisfactory stabilizers of this type include the phenols and their derivatives, other than those specified above, compounds containing both hydroxyl and amine groups, hydroxyazines, oximes, polymeric phenolic esters, and salts of multivalent metals in which the metal is in its lower valence state. Some specific examples of these stabilizers are described in U.S. Pat. No. 4,556,688, incorporated herein by reference.

The optional ultraviolet radiation stabilizers include, but are not limited to, the benzophenone derivatives, benzotriazole derivatives, and cyanoacrylates.

The optional fillers include, but are not limited to, carbon black, silica gel, alumina, clays, talc, and chopped fiberglass or glass particles. These fillers may be incorporated in amounts up to about 50 weight percent, preferably up to about 30 weight percent.

In addition, pigments may be utilized in the composition of the present invention.

DESCRIPTION OF THE PREFERRED EMBODIMENT

The following examples are presented to more fully and clearly illustrate the present invention. They are presented as illustrative of the invention and are not to be construed as limiting the invention thereto. In the examples all parts and percentages are on a weight basis unless otherwise specified.

The following Example 1 illustrates a polyetherimide composition following outside the scope of the instant invention in that it does not contain any multifunctional epoxy resin compound. This example is presented for comparative purposes only.

In all the examples, the compositions were prepared by melt blending the thermoplastic elastomer with the indicated additional components using a Prodex single screw extruder.

EXAMPLE 1

A composition was prepared which consisted of 99.5 weight percent of a polyetherimide ester resin and 0.5 weight percent of a stabilizer (Irganox 1010). The polyetherimide ester resin was comprised of the reaction products of a preformed polyoxyalkylene diimide diacid (formed by the reaction of Jeffamine D 3000 and trimillitic anhydride), dimethylterephthalate, and butanediol, with a weight ratio of polyoxyalkyalene diimide diacid to dimethylterephthalate being 0.7:1. The resin was formed, by injection molding, into test bars measuring 5 inches x ½ inches x 1/16 inch. The MV and other physical characteristics of the composition was tested bearing the results of these tests set forth in Table I below.

The following ASTM methods were used in determining the physical characteristics of the compositions:
Flexural Modulus: ASTM D790
Tensile Elongation: ASTM D638
Notched Izod: ASTM D256

EXAMPLES 2-3

In Example 2, a resin composition containing 99 parts by weight of a polyetherimide ester resin of a type used in Example 1, 0.5 parts by weight of the stabilizer used in Example 1, and 0.5 parts by weight of Dow Chemical Polyepoxy 9053.01 XD resin is injected molded into tests bars of the same dimensions as in Example 1. These tests bars are subjected to the same testing procedures as were the test bars utilized in Example 1. The results are set forth in Table I below.

In Example 3, of resin composition containing 99 parts by weight of a polyetherimide ester resin of the type used in example 1, 0.5 parts by weight of the stabilizer used in Example 1 and 0.5 parts by weight of Ciba-Geiby ECN resin 1299 were injection molded into test bars of the same dimensions as Example 1. These test bars were subjected to the same tests procedures as set forth in Example 1 and the results are set forth in Table I below.

TABLE I

| | Example No. | | |
|---|---|---|---|
| | 1 | 2 | 3 |
| MV | 670 | 3990 | 6070 |
| NI ¼", (ft lb/in) | NB | NB | NB |
| NI ¼", −30 C. (ft lb/in) | NB | NB | NB |
| Flexural Modulus, X10³ psi | 11 | 10.4 | 10.6 |

TABLE I-continued

| | Example No. | | |
|---|---|---|---|
| | 1 | 2 | 3 |
| Tensile Elongation, % | 210 | 170 | 170 |

NB = no break

It is obvious that the addition of the multifunctional epoxy result in compositions with much higher MV ratings.

EXAMPLES 4-7

These Examples show how, when a hindered phenol and thio ester are used in conjunction with the multifunctional epoxy and polyetherimide ester resin compositions, the resulting compositions show improved heat stability.

Examples 4 and 5 are outside the scope of the invention and are presented for comparative purposes only.

In Example 4, a composition containing 100 percent of the polyetherimide ester resin utilized in Example 1 was molded into test bars as per the procedure of Example 1. These test bars were subject to heat aging for four weeks at 150° C. Similarly, in Example 5, the formulation prepared which used 99.8 weight parts of the polyetherimide ester resin of Example 1 and 0.2 weight parts of a hindered phenol stabilizer (Irganox 1010). This composition was also molded into test bars as per Example 1, which were also heated for four weeks at 150° C.

It was discovered, after this period of time, that the test bars from Examples 4-5 had deteriorated to such a point that it was not possible to perform the Notched Izod, Tensile Strength and Tensile Elongation test procedures on the molded samples.

Examples 6 and 7 illustrate compositions that fall within the scope of the present invention.

In Example 6, test bars were molded, as per previous Examples, from a composition that contained 98.8 weight parts of the polyetherimide ester resin of the previously Examples, 0.2 weight parts of a hindered phenol resin (Irganox 1010), 0.5 weight parts of a multifunctional epoxy (ECN 1299) and 0.5 weight parts of a thio ester (Mark 2140). In Example 7, an identical composition was provided, with the exception that 0.5 weight parts of TGIC was substituted for 0.5 weight parts of ECN 1299.

The resulting test bars were also heated as per the provision of Examples 4 and 5, and were subject to the test procedures specified in Table II below. The test results are also set forth in Table II.

TABLE II

| | Example No. | |
|---|---|---|
| | 6 | 7 |
| NI ⅛", (ft lb/in) | 3.0 | NB |
| Tensile Strength (psi) | 1800 | 2600 |
| Tensile Elongation, % | 30 | 200 |

NB = no break

Obviously, other modifications and variations of the present invention are possible in light of the above teachings. It is therefore to be understood that changes may be made in the particular embodiments of the invention described which are within the full intended scope of the invention as defined by the appended claims.

What is claimed is:

1. A polyetherimide ester composition comprising:
   (i) as least one polyetherimid ester resin; and
   (ii) a modifier composition which is comprised of 0.1 to 2.0 weight percent of triglycidyl isocyanurate.

2. The composition of claim 1 which contains at least about 0.2 weight percent of triglycidyl isocyanurate based on the total weight of the polyetherimide ester resin and the triglycidyl isocyanurate.

3. The composition of claim 2 which contains at least 0.5 weight percent of triglycidyl isocyanurate based on the total weight of the polyetherimide ester resin and the epoxy thriglycidyl isocyanurate.

4. The composition of claim 1 wherein said modifier composition further comprises a thio ester and a hindered phenol.

5. The composition of claim 1 wherein said polyethermide ester contains imide groups, polyether groups, and ester groups.

6. The composition of claim 1 wherein said polyetherimide ester resin is comprised of the reaction products of
   (a) at least one diol;
   (b) at least one dicarboxylic acid or an ester forming reactive derivative thereof; and
   (c) a set of reactants selected from
   (1) (i) at least one high molecular weight poly(oxy alkylene)diamine, and (ii) at least one tricarboxylic acid or a derivative thereof, or
   (2) at least one high molecular weight polyoxyalkylene diimide diacid.

7. The composition of claim 6 wherein said diol is a low molecular weight diol.

8. The composition of claim 7 wherein said diol has a molecular weight of about 300 or less.

9. The composition of claim 8 wherein said diol contains from 2 to about 15 carbon atoms.

10. The composition of claim 6 wherein said dicarboxylic acid or its derivative is an aromatic dicarboxylic acid or its derivative.

11. The composition of claim 10 wherein said aromatic dicarboxylic acid or its derivative is dimethylterephtalate.

12. The composition of claim 11 wherein (c) is (1).

13. The composition of claim 12 wherein said high molecular weight poly(oxy alkylene)diamine is represented by the formula $$HN-G-NH$$

wherein G is the radical remaining after the removal of the amino groups of a long chain alkylene ether diamine.

14. The composition of claim 13 wherein said poly(oxy alkylene)diamine has an average molecular weight of from about 600 to about 12,000.

15. The composition of claim 14 wherein said poly(oxy alkylene)diamine is selected from poly(ethylene)diamine, poly(propylene ether)diamine, poly (tetramethylene ether)diamine, copoly(propylene etherethylene ether)diamine,, or mixtures thereof.

16. The composition of claim 6 wherein said tricarboxylic acid or its derivative (c)(1)(ii) is represented by the formula

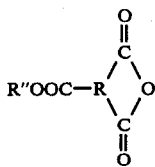

wherein R is a $C_1$ to $C_{20}$ trivalent aliphatic, cycloaliphatic or aromatic radical, and R" is hydrogen or a $C_1$-$C_6$ aliphatic monovalent radical.

17. The composition of claim 6 wherein (c) is (2).

18. The composition of claim 17 wherein said high molecular weight polyoxyalkylene diimide diacid is represented by the formula

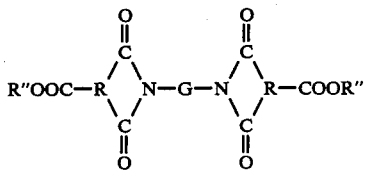

wherein:
  each R is independently selected from $C_1$-$C_{20}$ aliphatic, cycloaliphatic or aromatic trivalent organic radicals;
  each R" is independently selected from hydrogen, $C_1$-$C_6$ aliphatic or cycloaliphatic organic radicals, or $C_6$-$C_{12}$ aromatic monovalent organic radicals; and
  G is the radical remaining after the removal of the amino groups of a long chain alkylene ether diamine.

19. The composition of claim 1 wherein said polyetherimide ester resin is comprised of at least the following recurring structural units:

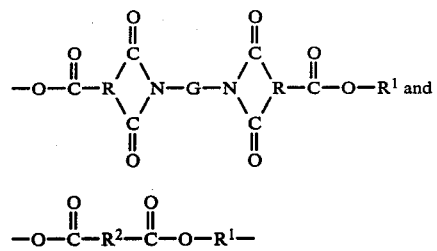

wherein:
  $R^1$ is the residue of a diol absent the two hydroxyl groups;
  $R^2$ the residue of a dicarboxylic acid absent the two carboxyl groups;
  R is a trivalent organic radical; and
  G is the radical remaining after the removal of the amino groups of a long chain poly(oxy alkylene)-diamine.

20. The composition of claim 19 wherein $R^2$ is the residue of an aromatic dicarboxylic acid.

21. The composition of claim 20 wherein $R^2$ is the residue of dimethylterephthalate.

22. The composition of claim 20 wherein said long chain alkylene ether diamine has an average molecular weight of from about 600 to about 12,000.

23. The composition of claim 21 wherein $R^1$ is the residue of a diol having a molecular weight of about 300 or less.

24. The composition of claim 23 wherein each R is a $C_6$ trivalent aromatic hydrocarbon radical and each R" is hydrogen.

25. The composition of claim 1 which further contains a filler.

* * * * *